United States Patent Office 2,944,962
Patented July 12, 1960

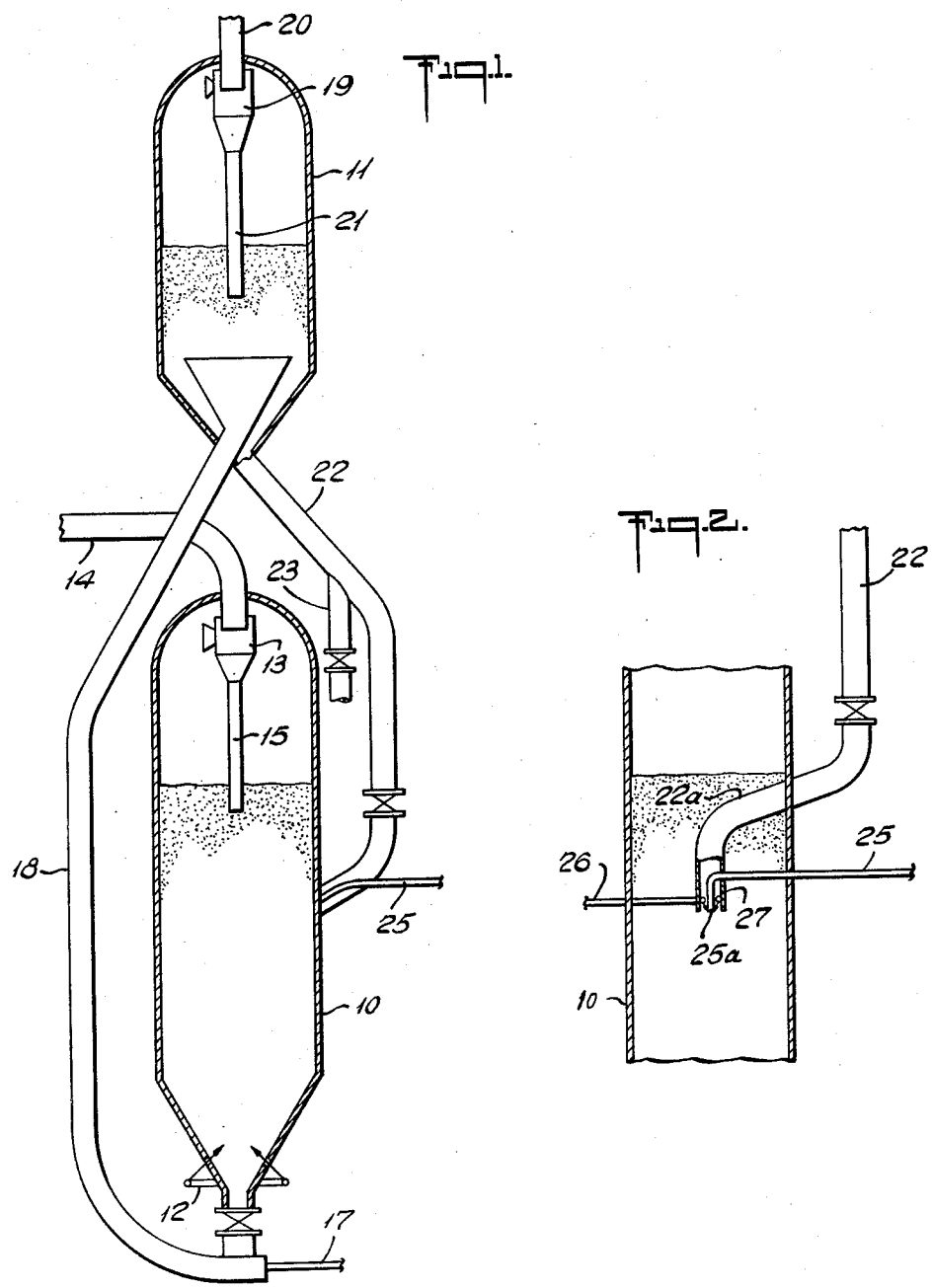

2,944,962

FLUID CONTACT COKING OF HYDROCARBON OILS

Claude H. McIntosh and Wiley P. Ballard, Port Arthur, Tex., assignors to Texaco Inc., a corporation of Delaware Filed Jan. 11, 1955, Ser. No. 481,057

5 Claims. (Cl. 208—127)

This invention relates to the fluid contact coking of hydrocarbon oils and is concerned particularly with a process in which the oil is subjected to cracking and coking in contact with powdered or pulverulent coke under fluidized conditions and in which coke from the fluid contacting zone is subjected to combustion and the hot coke recycled to the reaction zone.

In this type of process difficulty has been experienced in obtaining proper distribution of the oil feed over the powdered coke. Without proper distribution agglomeration of coke particles and heavy residual oil occurs which interferes with proper fluidization. There has, moreover, been a tendency, when introducing the oil through a nozzle into the mass of fluidized coke, for the building up of coke deposits or agglomerates about the nozzle. The present invention is directed to overcoming these difficulties.

In accordance with the invention the oil charging stock is admitted to the reactor through a line or nozzle about which the powdered or pulverulent coke is also admitted. The flow of coke past the charging line or nozzle serves to produce a scouring effect keeping the pipe or nozzle free from coke deposits or agglomerates.

The process is adapted particularly for the cracking and coking of residual stocks, such as reduced crude petroleum, cracked residues, heavy residues from shale oil, tars from the carbonization of coal and other heavy residues, to produce gasoline as well as intermediate oils including kerosene and gas oil.

For the purpose of more fully explaining the invention reference is had to the accompanying drawings wherein:

Figure 1 is a diagrammatic sectional elevation of an apparatus constituting a preferred embodiment of the invention.

Figure 2 is a partial sectional view of a modification of the invention.

The apparatus illustrated in Figure 1 includes a reactor 10 and a superposed coke burner 11. In the reactor the oil is subjected to cracking and coking in contact with powdered coke under fluidized conditions with the formation of a dense phase and a superposed dilute phase. Steam or gas for maintaining fluidized conditions is admitted at the bottom of the reactor by a ring distributor 12. Evolved vapors and gases are removed through a separator or cyclone 13 to a vapor line 14 by which the vapors and gases are conducted to suitable fractionating equipment (not shown). Fines separated in the cyclone 13 are returned to the dense phase through a dip leg 15. Coke particles are withdrawn from the bottom of the reactor through a line 16 to be picked up in a stream of air or oxygen containing gas admitted by a line 17. The mixture is passed through a line 18 to the coke burner 11 and the coke is subjected to combustion in line 18 and chamber 11 with fluidized conditions being maintained in the chamber 11 and resultant formation of a dense phase and a superposed dilute phase. The flue gases are removed through a separator or cyclone 19 and flue 20, the coke fines being returned to the dense phase by a dip leg 21. The hot coke from the burner descends through a standpipe 22 and is admitted into the reactor 10 at an intermediate point thereof and into the dense phase therein. Product coke is withdrawn from the standpipe 22 by a line 23. The coke so withdrawn may be passed to a separator or screen for segregating the larger particles from the finer particles so as to remove the larger particles from the system and to collect the finer particles for re-use in the process.

The oil charging stock is directed through a line 25 to the reactor 10. As shown in the drawing the line 25 extends within the coke return line 22 and each of these lines terminates at a point approximately flush with the wall of the reactor. Line 25 or at least the terminus of the line is preferably disposed centrally of the line 22. The coke particles sweeping past the oil discharge nozzle produce a scouring effect thereon and prevent the formation of deposits or agglomerates about the outlet of the pipe. The oil and coke upon leaving the outlets of the pipes 25 and 22, respectively, come immediately into contact with the turbulent mass of fluidized constituents in the reactor so that the oil and coke are thoroughly distributed in the fluidized mass.

In the modification of the invention illustrated in Figure 2 the coke return line 22 from the burner has a section 22a extending into the reactor 10 so as to discharge the coke at a central point therein and in a downward direction into the fluidized mass and the charging line 25 extends into the reactor 10 and into the pipe 22a with a nozzle 25a which extends centrally of the outlet of the pipe 22a. The coke particles passing downwardly through the pipe 22a sweep past the nozzle 25a and prevent the formation of coke deposits or agglomerates about the nozzle and the introduced oil and coke are immediately distributed in the fluidized mass.

In a further modification of the invention a fluid such as steam is admitted by a line 26 into a ring distributor 27 for directing high velocity jets toward the pipe or nozzle 25a so that, by the combined action of the coke particles and the high velocity jets, the formation of deposits about the nozzle is prevented. If desired high velocity jets may also be used in the apparatus of Figure 1 to prevent the formation of any obstructions that may develop about the line 25. Normally the movement of the coke particles passing the charging oil nozzle is adequate to prevent the formation of any obstructions; the additional use of the high velocity jets constitutes a further safeguard in assuring continuity of operation.

In the methods of both Figure 1 and Figure 2 the oil feed and the hot coke charged to the reactor are admitted into the dense phase of the reactor so that the materials introduced immediately come into contact with the turbulent mass which promotes the proper distribution of the oil and coke particles. In the method of Figure 1 the sweep of gases and vapors carrying the coke particles past the tip of the feed oil pipe or nozzle serves to prevent agglomerates and deposits at this critical point. This method also has the advantage of avoiding the use of pipes within the reactor which would provide metal surfaces on which coke could adhere. The method of Figure 2 has the advantage of introducing the hot coke and the oil feed directly into a central point, that is at the axis of the turbulent mass, which promotes the distribution of the oil feed over the coke particles.

The temperatures employed in the reactor 10 are the ordinary temperatures used in fluid contact coking, such as of the order of 900° F. and 1000° F. The operation is preferably conducted under moderate superatmospheric pressures. The coke from the burner continuously descends under gravity head through the standpipe 22 and the feed stock is continuously charged through the line 25. The downflowing coke sweeping past the nozzle of the feed pipe normally keeps it free of any coke deposits. As stated, high velocity steam jets may also be directed at the nozzle as a further safeguard in the prevention of coke deposits. In one method of operating the steam jets may be employed intermittently instead of continuously.

When good fluidizing conditions are being maintained in the dense phase of the reactor the temperature is substantially uniform throughout the fluidized mass. Normally the temperature differential will not vary over about 5°. When the temperature differential is as much as 10–15° F. there is indication that agglomeration may be beginning at the lower temperature point. Consequently by observing the temperature at a point in close proximity to the nozzle and noting any reduction in temperature at that point indicative of the formation of agglomerates the operator is made quickly aware of the condition and may correct it before any serious results occur. Normally the flow of coke along the feed oil nozzle is adequate to prevent the formation of agglomerates or obstructions about the nozzle but when indications of agglomeration at that point are observed the high velocity jets may be directed against the nozzle to effect removal of any obstructions and thereafter the flow of steam is stopped and the normal operation resumed in which the movement of the coke particles functions to keep the nozzle clean.

Obviously, many modifications and variations of the invention, as hereinbefore set forth, may be made without departing from the spirit and scope thereof, and therefore only such limitations should be imposed as are indicated in the appended claims.

We claim:

1. In a fluid contact coking of hydrocarbon oils wherein the oil is contacted in a reactor with finely divided coke in a dense phase under fluidized conditions, coke withdrawn from the reactor and subjected to combustion in a burning zone and resultant highly heated coke recycled to the reactor, the process that comprises passing the hot coke from the burning zone to the reactor through a conduit terminating in said dense phase of the fluidized mass and introducing the charge oil through a pipe extending interiorly of said conduit and terminating at a point adjacent to the termination of said conduit so that the hot coke from the burning zone at substantially the temperature of said burning zone and the charge oil are first brought together and intimately commingled at a localized zone in the dense phase.

2. In a fluid contact coking of hydrocarbon oils wherein the oil is contacted in a reactor with finely divided coke in a dense phase under fluidized conditions, coke withdrawn from the reactor and subjected to combustion in a burning zone and resultant highly heated coke recycled to the reactor, the process that comprises conducting the hot coke from the burning zone to the reactor through a conduit terminating in said dense phase approximately flush with the wall of the reactor, introducing the charge oil through a pipe extending interiorly of said conduit and terminating adjacent the terminus of said conduit so that the hot coke from the burning zone at substantially the temperature of said burning zone and the charge oil are first brought together in a localized zone in the dense phase adjacent the wall of the reactor.

3. A fluid contact coking process in accordance with claim 1 wherein steam jets are directed at the terminus of the oil charge pipe.

4. Apparatus for the fluid contact coking of hydrocarbon oils which comprises a reactor adapted for containing a fluidized mass under cracking and coking temperature, a coke burning chamber, means for conducting coke from the reactor to the coke burning chamber, a conduit disposed to conduct coke from the burning chamber directly to an intermediate point of the reactor, an oil charge line the terminal end of which is disposed concentrically within the coke conduit, said oil charging line and coke conduit terminating adjacent each other.

5. Apparatus for the fluid contact coking of hydrocarbon oils which comprises a reactor adapted for containing a fluidized mass, a coke burning chamber, means for conducting coke from the reactor to the coke burning chamber, a conduit disposed to conduct coke from the coke burning chamber directly to the reactor and having a terminus approximately flush with the wall of the reactor, an oil charge pipe the terminal end of which is disposed within said conduit and terminating adjacent the terminus of the coke conduit.

References Cited in the file of this patent

UNITED STATES PATENTS

| | | |
|---|---|---|
| 2,598,058 | Hunter | May 27, 1952 |
| 2,608,526 | Rex | Aug. 26, 1952 |
| 2,699,421 | Borgerson et al. | Jan. 11, 1955 |
| 2,701,788 | Schutte | Feb. 8, 1955 |
| 2,707,702 | Watson | May 3, 1955 |
| 2,717,867 | Jewell et al. | Sept. 13, 1955 |
| 2,739,104 | Galbreath et al. | Mar. 20, 1956 |
| 2,763,601 | Martin et al. | Sept. 18, 1956 |
| 2,872,411 | Krebs et al. | Feb. 3, 1959 |

OTHER REFERENCES

"Petroleum Processing," September 1953, pp. 1316–17.